United States Patent [19]

Rausch

[11] 3,847,794

[45]*Nov. 12, 1974

[54] SULFUR-FREE REFORMING WITH A PLATINUM-TIN CATALYST

[75] Inventor: Richard E. Rausch, Mundelein, Ill.

[73] Assignee: Universal Oil Products Company, Des Plaines, Ill.

[ * ] Notice: The portion of the term of this patent subsequent to July 10, 1990, has been disclaimed.

[22] Filed: May 29, 1973

[21] Appl. No.: 364,577

Related U.S. Application Data

[63] Continuation-in-part of Ser. Nos. 201,576, Nov. 23, 1971, Pat. No. 3,745,112, and Ser. No. 807,910, March 17, 1969, Pat. No. 3,740,328.

[52] U.S. Cl................ 208/88, 208/89, 208/139
[51] Int. Cl............................................ C10g 35/08
[58] Field of Search ............... 208/138, 139, 88, 89

[56] References Cited
UNITED STATES PATENTS

| | | | |
|---|---|---|---|
| 3,745,112 | 7/1973 | Rausch | 208/139 |
| 3,415,737 | 12/1968 | Kluksdahl | 208/139 |
| 3,554,902 | 1/1971 | Buss | 208/138 |
| 3,234,120 | 2/1966 | Capsuto | 208/138 |

Primary Examiner—Herbert Levine
Attorney, Agent, or Firm—James R. Hoatson, Jr.; Thomas K. McBride; William H. Page, II

[57] ABSTRACT

A substantially sulfur-free gasoline fraction is catalytically reformed by contacting it and a substantially sulfur-free hydrogen stream at reforming conditions with a substantially sulfur-free, bimetallic catalyst, comprising a combination of a platinum group component, a tin component, and a halogen component with a porous carrier material. Key features of the disclosed process are: (1) use of substantially sulfur-free charge stock and hydrogen stream; (2) maintenance of substantially all of the platinum group component of the bimetallic catalyst in the elemental state; (3) presence of substantially all of the tin component of the bimetallic catlyst in an oxidation state above that of the elemental metal; and (4) maintenance of the bimetallic catalyst in a substantially sulfur-free state during the processing period.

15 Claims, No Drawings

SULFUR-FREE REFORMING WITH A PLATINUM-TIN CATALYST

CROSS-REFERENCES TO RELATED APPLICATIONS

This application is a continuation-in-part of my prior, copending application Ser. No. 201,576, now U.S. Pat. No. 3,745,112 which was filed on Nov. 23, 1971, and of my prior, copending application Ser. No. 807,910, which was filed on Mar. 17, 1969, now U.S. Pat. No. 3,740,328 all of the teachings of these prior applications being specifically incorporated herein by reference.

The subject of the present invention is an improved catalytic reforming process wherein a unique bimetallic catalyst is coupled with the use of a substantially sulfur-free environment to enable a substantial increase in the activity, selectivity and stability characteristics of the resulting process. More precisely, the present invention involves the use of a novel bimetallic catalyst in a reforming process which is operated in a substantially sulfur-free environment, thereby preventing detrimental interaction of sulfur with this bimetallic catalyst and allowing the catalyst to perform in a more efficient and effective manner. In one important aspect, the present invention involves the use of a substantially sulfur-free, bimetallic catalytic composite comprising a combination of a platinum group component, a tin component and a halogen component with a porous carrier material (the catalyst having substantially all of the platinum group component present as elemental metal and substantially all of the tin component present in an oxidation state above that of the elemental metal) in a reforming process which is maintained substantially free of sulfur and sulfur-containing compounds by catalytically pretreating the feed to remove substantially all sulfurous contaminants therefrom. In another aspect, this type of bimetallic catalyst is utilized in a catalytic reforming process which is not only maintained free of sulfur but also is carefully controlled so that the amount of water and water-producing substances entering therein is held to a low level.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used — that is, the temperature, pressure, contact time, and presence of diluents such as $H_2$; (2) selectivity refers to the amount of desired product or products obtained relative to the amount of reactants converted or charged; (3) stability refers to the rate of change with time of the activity and selectivity parameters — obviously the smaller rate implying the more stable catalyst. In a reforming process, for example, activity commonly refers to the amount of conversion that takes place for a given charge stock at a specified severity level and is typically measured by octane number of the $C_5+$ product stream; selectivity usually refers to the relative amount of $C_5+$ yield that is obtained at the particular severity level; and stability is typically equated to the rate of change with time of activity, as measured by octane number of $C_5+$ product and of selectivity, as measured by $C_5+$ yield. Actually, the last statement is not strictly correct because generally a continuous reforming process is run to produce a constant octane $C_5+$ product with a severity level being continuously adjusted to attain this result; and, furthermore, the severity level is for this process usually varied by adjusting the conversion temperature in the reaction zone so that in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability. In particular, for a reforming process the problem is typically expressed in terms of shifting and stabilizing the $C_5+$ yield-octane relationship — $C_5+$ yield being representative of selectivity, and octane being proportional to activity.

In my prior applications, I disclosed a dual-function bimetallic catalytic composite which possesses improved activity, selectivity, and stability when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, disproportionation, oligomerization, hydrodealkylation, transalkylation, cyclization, dehydrocyclization, cracking, hydrocracking, reforming, and the like processes. In particular, I reported on my discovery that the use of a bimetallic catalyst, comprising a combination of a platinum group component, a tin component, and a halogen component with a porous refractory carrier material, can enable the performance of a hydrocarbon conversion process utilizing a dual-function catalyst to be substantially improved.

I have previously established that an essential condition associated with the acquisition of the most beneficial performance of this bimetallic catalyst is the oxidation state of the tin component utilized in this catalyst. My findings here were that the tin component must be utilized in a positive oxidation state (i.e., either +2 or +4) and that the tin component must be uniformly distributed throughout the porous carrier material in a relatively small particle size of less than 100 Angstroms in maximum dimension. In addition, I found that in order to achieve the desired oxidation state and the distribution of the tin component in the desired particle size, the presence of a halogen component in the composite was essential. Furthermore, I disclosed that this improved bimetallic catalyst must be prepared under carefully controlled conditions in order to achieve the desired oxidation state as will be explained hereinafter. In the case of a catalytic reforming process, one of the principal advantages associated with the use of this improved bimetallic catalyst is that it enables the reforming process to operate in a highly stable manner in a high-severity operation; for example, a continuous reforming process producing a $C_5+$ reformate having an octane of about 100 F—1 clear and utilizing a relatively low pressure selected from the range of about 50 to about 350 psig. In short, the invention disclosed in my prior applications essentially involves the finding that the additon of a controlled amount of properly dispersed and oxidized tin component to a dual-function hydrocarbon conversion catalyst containing a platinum group component and a halogen component enables the performance characteristics of the resulting catalyst to be sharply and materially improved.

According to the present invention, I have now discerned that a further improvement in a reforming process using the type of improved bimetallic catlayst described above is possible if the reforming zone is maintained substantially free of sulfur. By the use of the expression "substantially free of sulfur" it is intended to cover the situation where the reforming zone or the environment containing the catalyst is maintained substantially free of sulfur and sulfur-containing compounds — particularly, free of sulfide and of sulfur-containing compounds that yield hydrogen sulfide at catalytic reforming conditions. The concept of the present invention developed from a series of experiments which were performed in order to investigate the sulfur sensitivity of this type of bimetallic catalyst. As a result of these experiments, I have now ascertained that this type of bimetallic catalyst is extremely sensitive to the presence of sulfur in its environment regardless of the atomic ratio of the metallic ingredients contained therein. In particular, I have observed that the presence of sulfur in the charge stock can cause the performance of this catalyst in a catalytic reforming process to decay at an accelerated rate relative to the performance observed in the absence of sulfur. In short, the present invention especially involves the finding that this particular type of improved bimetallic catalyst performs in the superior manner in a catalytic reforming process if sulfur is excluded therefrom.

It is accordingly, an object of the present invention to provide an improved method of operating a catalytic reforming process which utilizes a bimetallic catalyst of the type described herein.

In one embodiment, the present invention is a process for catalytically reforming a substantially sulfur-free gasoline fraction with a substantially sulfur-free bimetallic catalyst comprising a combination of a platinum group component, a tin component and a halogen component with a porous carrier material. According to this process, the gasoline fraction and a substantially sulfur-free hydrogen stream are contacted with the bimetallic catalyst at reforming conditions. The bimetallic catalyst is characterized by the states in which the metallic components are present therein; specifically, substantially all of the platinum group component is present as the elemental metal and substantially all of the tin component is present in an oxidation state above the elemental metal and is uniformly dispersed throughout the porous carrier material in a particle size which is less than 100 Angstroms in maximum dimensions. Moreover, this catalyst is maintained throughout the processing period in a substantially sulfur-free state by excluding sulfur from the gasoline fraction and hydrogen stream charged to the process. Additionally, the bimetallic catalyst contains these components in amounts sufficient to result in a composite containing, on an elemental basis, about 0.1 to about 2 wt. % of the platinum group metal, about 0.01 to about 5 wt. % of tin and about 0.5 to about 3.5 wt. % halogen.

In another embodiment, the present invention relates to an improvement in a catalytic reforming process wherein a sulfur-containing gasoline charge stock and autogenous hydrogen are contacted with a bimetallic catalyst at reforming conditions. The bimetallic catalyst comprises a combination of a platinum group metal, a tin component, and a halogen component with a porous carrier material in a manner such that substantially all of the platinum group component is present as the elemental metal and substantially all of the tin component is uniformly dispersed throughout the porous carrier material in a relatively small particle size and is present in an oxidation state above that of the elemental metal and such that the catalyst contains, on an elemental basis, about 0.01 to about 2 wt. % platinum group metal, about 0.01 to about 5 wt. % tin and about 0.5 to about 3.5 wt. % halogen. Against this background, the improvement of the present invention involves pretreating the gasoline charge stock to this process in order to remove substantially all of the sulfurous nitrogenous and water-yielding contaminants therefrom.

Other objects and embodiments of the present invention encompass further details about preferred ingredients and amounts of ingredients for this special kind of bimetallic catalyst, methods of preparing this catalyst, types of charge stocks that can be catalytically reformed in the present process, and conditions and procedures for performing the instant improved process. These are all hereinafter presented in the following detailed discussion of each of these facts of the present invention. It is to be noted that the term "catalyst" and "catalytic composite" are used herein in an equivalent and interchangeable manner.

The improved bimetallic catalyst utilized in the present invention comprises a porous carrier material or support having combined therewith catalytically effective amounts of a platinum group component, a tin component and a halogen component. Considering first the porous carrier material utilized in the present invention, it is preferred that the material be a porous, adsorptive, high surface area support having a surface area of about 25 to about 500 $m^2/g$. The porous carrier material should be relatively refractory to the conditions utilized in the hydrocarbon conversion process, and it is intended to include within the scope of the present invention carrier materials which have traditionally been utilized in dual-fraction hydrocarbon conversion catalysts such as: (1) activated carbon, coke, or charcoal; (2) silica or silica gel, clays and silicates including those synthetically prepared and naturally occurring, which may or may not be acid treated; for example, attapulgus clay, china clay, diatomaceous earth, fuller's earth, kaoline, kieselguhr, pumice, etc.; (3) ceramics, procelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) zeolitic crystalline aluminosilicates such as naturally occurring or synthetically prepared mordenite and/or faujasite, either in the hydrogen form or in a form which has been treated with multi-valent cations; and, (6) combinations of one or more elements from one or more of these groups. The preferred porous carrier materials for use in the present invention are refractory inorganic oxides with best results obtained with an alumina carrier material. Suitable alumina materials are the crystalline aluminas known as the gamma-, eta-, and theta-alumina with gamma- and eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.3 to about 0.7 g/cc and surface area characteristics such that the average pore diameter is about 20 to 300 Angstroms, the pore volume is about 0.1 to about 1 cc/g and the surface area is about 100 to about 500 $m^2/g$. In general, best results are typically obtained with a gamma-alumina carrier material which is used in the form of spherical particles having: a relatively small diameter (i.e., typically about 1/16 inch), an apparent bulk density of about 0.5 g/cc, a pore volume of about 0.4 ml/g, and a surface area of about 175 $m^2/g$.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at relatively low temperature of about 300° F. to about 400° F. and subjected to a calcination procedure at a temperature of about 850° F. to about 1,300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the improved catalyst used in the present invention is a tin component, and it is an essential feature of the present invention that substantially all of the tin component in the catalyst is in an oxidation state above that of the elemental metal. That is, it is believed that best results are obtained when substantially all of the tin component exists in the catalytic composite in the +2 or +4 oxidation state. Accordingly, the tin component will be present in the composite as a chemical compound such as the oxide, sulfide, halide, oxyhalide, oxysulfide and the like wherein the tin moiety is in a positive oxidation state, or in chemical combination with the carrier material in a manner such that the tin component is in a positive oxidation state. Controlled reduction experiments with the catalytic composites produced by the preferred methods of preparing the instant catalytic composite have established that the tin component in these catalysts is in a positive oxidation state and is not reduced by contact with hydrogen at temperatures in the range of 1,000° to 1,200° F. It is important to note that this limitation on the oxidation state of the tin component requires extreme care in preparation and use of the present catalysts to insure that it is not subjected to a reducing atmosphere at temperatures above 1,200° F. Equally significant is my observation that it is only when the tin component is in a uniformly dispersed state in the carrier material that it has the capability to maintain its positive oxidation state when subjected to hereinafter described prereduction step. Stated another way, if the tin component is not properly dispersed on the support it can be reduced in the prereduction step and result in an inferior catalyst. Based on the evidence currently available it is believed that best results are obtained when the tin component is present in the catalyst as tin oxide. The term "tin oxide" as used herein refers to a coordinated tin-oxygen complex which is not necessarily stoichiometric.

Interrelated with this oxidation state limitation are the factors of dispersion of the tin component in the support and of particle size of the tin component. This interrelationship emanates from my observation that it is only when the tin component is uniformly dispersed throughout the carrier material in a particle size having a miximum dimension less than 100 Angstroms that it can successfully maintain its preferred oxidation state when it is subjected to a high temperature prereduction treatment as hereinafter described. Thus it is an essential feature of my invention that the catalytic composite is prepared in a manner selected to meet the stated particle size and uniform dispersion limitations. By the use of the expression "uniform dispersion of the tin component in the carrier material" it is intended to describe the situation where the concentration of the tin ingredient is approximately the same in any divisable portion of the carrier material. Similarly, the expression "particles having a maximum dimension less than 100 A" is intended to denote particles that would pass through a sieve having a 100 A mesh size if it were possible to make such a sieve.

The tin component may be incorporated into the catalytic composite in any suitable manner known to effectively disperse this component throughout the carrier material in the required particle size. Thus this component may be added to the carrier by a coprecipitation or cogellation of a suitable soluble tin salt with the carrier material, by ion-exchange of suitable tin ions with ions contained in the carrier material when the ion exchange sites are uniformly distributed throughout the carrier, or controlled impregnation of the carrier material with a suitable soluble tin salt under conditions selected to result in penetration of all sections of the carrier material by the tin component. One preferred method of incorporating the tin component involves coprecipitating it during the preparation of the preferred carrier material, alumina. This method typically involves the addition of a suitable soluble tin compound such as stannous or stannic chhloride to an alumina hydrosol, mixing these ingredients to obtain a uniform distribution of the tin moiety throughout the sol and then combining the hydrosol with a suitable gelling agent and dropping the resulting mixture into an oil bath etc., as explained in detail hereinbefore. After drying and calcining the resulting gelled carrier material there is obtained an intimate combination of alumina and tin oxide having the required dispersion and particle size. Another preferred method of incorporating the tin component into the catalytic composite involves utilization of a soluble, decomposable compound of tin to impregnate the porous carrier material. In general, the solvent used in this impregnation step is selected on the basis of the capability to dissolve the desired tin compound and to hold the tin moiety in solution until it is evenly distributed throughout the carrier material and is preferably an aqueous, rather strongly acidic solution. Thus the tin component may be added to the carrier material by commingling the latter with an aqueous, acidic solution of suitable tin salt or suitable compound of tin such as stannous bromide, stannous chloride, stannic chloride, stannic chloride pentahydrate, stannic chloride diamine, stannic trichloride bromide, stannic chromate, stannous fluoride, stanic fluoride, stannic iodide, stannic sulfate, stannic tartrate and the like compounds. The acid used in the impregnation solution may be any organic or inorganic acid that is capable of maintaining the pH of the impregnation solution in the range of about $-1$ or less to about 3 and preferably less than 1 during the impregnation step and that does not contaminate the resultant catalyst. Suitable acids are: inorganic acids such as hydrochloric acid, nitric acid, and the like; and strongly acidc organic acids such as oxalic acid, malonic acid, citric acid and the like. A particularly preferred impregnation solution comprises stannic or stannous chloride dissolved in a hydrochloric acid solution containing HCl in an amount corresponding to at least about 5 wt. % of the carrier material which is to be impregnated. Another useful impregnation solution is stannous or stannic chloride dissolved in an anhydrous alcohol such as ethanol. In general, the tin component can be incorporated either prior to, simultaneously with, or after the platinum group component is added to the carrier material. However, I have found that excellent results are obtained when the tin component is incorporated simultaneously with the platinum group component. In fact, I have determined that a preferred aqueous impregnation solution contains chloroplatinic acid, a relatively high amount of hydrogen chloride, and stannic or stannous chloride.

Regardless of which tin compound is used in the preferred impregnation step, it is essential that the tin component be uniformly distributed throughout the carrier material. In order to achieve this objective with an aqueous impregnation solution it is necessary to dilute the impregnation solution to a volume which is approximately equal or substantially in excess of the volume of the carrier material which is impregnated and to add a relatively strong acid such as hydrochloric acid, nitric acid and the like to the impregnation solution in an amount calculated to maintain the pH of the impregnation solution in a range of about $-1$ or less to about 3, preferably less than 1. It is preferred to use a volume ratio of impregnation solution to carrier material of at least 0.5:1 and preferably about 1:1 to about 10:1 or more. Similarly, it is preferred to use a relatively long contact time during the impregnation step ranging from about ¼ hour up to about ½ hour or more before drying to remove excess solvent in order to insure a high dispersion of the tin component into the carrier material. The carrier material is, likewise, preferably constantly agitated during this preferred impregnation step.

This improved bimetallic catalyst used in the present invention also contains a platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, oxyhalide, oxysulfide, etc., or as an elemental metal or in combination with one or more of the other ingredients of the catalyst. From the evidence currently available it is believed that best results are obtained with this catalyst when substantially all of the platinum group component exists therein in the elemental state and the hereinafter described prereduction step is designed to accomplish this objective. Generally, the amount of the platinum group component present in the final catalyst composite is small compared to the quantities of the other components combined therewith. In fact, the platinum group component generally comprises about 0.01 to about 2 wt. % of the final catalytic composite, calculated on an elemental basis. Excellent results are obtained when the catalyst contains about 0.05 to about 1 wt. % of the platinum group metal. The preferred platinum group component is platinum metal, although good results are also obtained when it is palladium metal or iridium metal.

The platinum group component may be incorporated in the catalytic composite in any suitable manner such as coprecipitation or cogellation with the preferred carrier material, or ion exchange or impregnation thereof. The preferred method of preparing the catalyst involves the utilization of a water-soluble, decomposable compound of a platinum group metal to impregnate the carrier material. Thus, the platinum group component may be added to the support by commingling the latter with an aqueous solution of chloroplatinic, chloroiridic or chloropalladic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyldichloride, dinitrodiaminoplatinum, palladium dichloride, palladium nitrate, palladium sulfate, etc. The utilization of a platinum group compound containing halogen, such as chloroplatinic or chloropalladic acid, is preferred since it facilitates the incorporation of both the platinum group component and at least a minor quantity of the halogen component in a single step. Hydrogen chloride or the like acid is also generally added to the impregnation solution in order to further facilitate the incorporation of the halogen component and to aid in the distribution of the platinum group component throughout the carrier material. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Another essential constituent of the improved bimetallic catalyst is the halogen component. Although the precise form of the chemistry of the association of the halogen component with the carrier material is not entirely known, it is customary in the art to refer to the halogen component as being combined with the carrier material or with the other ingredients of the catalyst in the form of the halide (e.g. chloride or fluoride). This combined halogen may be either fluorine, chlorine, iodine, bromine, or mixtures thereof. Of these, fluorine and, particularly, chlorine are preferred. The halogen may be added to the carrier material in any suitable manner either during the preparation of the carrier material or before or after the addition of the other components. For example, the halogen may be added at any stage of the preparation of the carrier material or to the calcined carrier material as an aqueous solution of a suitable water-soluble halogen-containing compound such as hydrogen fluoride, hydrogen chloride, hydrogen bromide, ammonium chloride, etc. The halogen component or a portion thereof may be combined with the carrier material during the impregnation of the latter with the platinum group component; for example, through the utilization of a mixture of chloroplatinic acid and hydrogen chlorde. In another situation, the alumina hydrosol which is typically utilized to form the preferred alumina carrier material may contain halogen and thus contribute at least a portion of the halogen component to the final composite. For reforming, the halogen is combined with the carrier material in an amount sufficient to result in a final composite that contains about 0.1 to about 3.5 wt. % and preferably about 0.5 to about 1.5 wt. % of the halogen calculated on an elemental basis. The preferred halogen component is chlorine or a compound of chlorine. Good results are also obtained when it is fluorine or a compound of fluorine.

Regarding the amount of the tin component contained in the improved composite, it is preferably sufficient to constitute about 0.01 to about 5 wt. % of the final composite, calculated on an elemental basis, although substantially higher amounts of tin may be utilized in some cases. Best results are typically obtained with about 0.1 to about 1 wt. % tin. Irrespective of the absolute amounts of the tin component and the platinum group component utilized, the atomic ratio of tin to the platinum group metal contained in the bimetallic catalyst is preferably selected from the range of about 0.1:1 to about 3:1, with best results achieved at an atomic ratio of about 0.5:1 to 1.5:1. This is particularly true when the total content of the tin component plus the platinum group component in the catalytic composite is fixed in the range of about 0.15 to about 2 wt. % thereof, calculated on an elemental tin and platinum group metal basis.

Regardless of the details of how the components of the bimetallic catalyst are combined with the porous carrier material, the final catalyst generally will be dried at a temperature of about 200° to about 600° F. for a period of about 2 to about 24 hours or more, and finally calcined or oxidized at a temperature of about 700° F. to about 1,100° F. in an air atmosphere for a period of at least about 0.5 to about 10 hours in order to convert substantially all of the metallic components to the corresponding oxide form. Best results are generally obtained when the halogen content of the catalyst is adjusted during the oxidation step by including a halogen or a halogen-containing compound in the air atmosphere utilized. In particular, when the halogen component of the catalyst is chlorine, it is preferred to use a mole ratio of H₂O to HCl of about 20:1 to about 100:1 during at least a portion of the calcination step in order to adjust the final chlorine content of the catlayst to a range of about 0.5 to about 1.5 wt. %.

It is essential that the resultant oxidized catalytic composite be subjected to a reduction step with a substantially water-free reduction agent prior to its use in the conversion of hydrocarbons. This step is designed to selectively reduce the platinum group component and to insure a uniform and finely divided dispersion of the metallic components throughout the carrier material. Preferably, substantially pure and dry hydrogen (i.e., less than 20 vol. ppm. $H_2O$) is used as the reducing agent in this step. A stream of the reducing agent is contacted with the oxidized catalyst at conditions, including a temperature of about 600° F. to about 1,200° F., a gas hourly space velocity of about 100 to 1000 or more $hr.^{-1}$, and for a period of about 0.5 to 10 hours, selected to reduce substantially all of the platinum group component to the metallic state while maintaining substantially all of the tin component in an oxidized state. This reduction step may be performed in situ as part of a startup sequence if precautions are taken to predry the plant to a substantially water-free state and if substantially water-free hydrogen is used. Preferably at least the initial portion of the reduction is done slowly (i.e. at lower temperatures) in order to minimize the adverse effects of the water formed by the reduction reaction.

The resulting reduced catalytic composite is, in accordance with the basic concept of the present invention, preferably maintained in a substantially sulfur-free state both during its preparation and thereafter during its use in the present process. It is, accordingly, a highly preferred practice to avoid presulfiding this bimetallic catalyst prior to its use in the present process. Even though any sulfur initially present on the catalyst would be removed during a first portion of the instant process, the preferred practice is to initially exclude all sources of sulfur from the reforming zone including sulfur contained in the catalyst.

According to the present invention, a hydrocarbon charge stock and hydrogen are contacted with a bimetallic catalyst of the type described above in a reforming zone which is maintained in a substantially sulfur-free state. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics are also present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha — for example, a naphtha boiling in the range of $C_7$ to 400° F. In some cases, it is also advantageous to charge pure hydrocarbons or mixture of hydrocarbons that have been extracted from hydrocarbon distillates — for example, straight chain paraffins — which are to be converted to aromatics.

An essential feature of the present invention is that the hydrocarbon charge stock is substantially free of sulfur. Quantitatively, use of the expression "substantially free" is intended to cover the situation where the total amount of sulfur contained in the charge stock in any form constitutes less than 10 wt. ppm. of same, and preferably less than 1 wt. ppm. of same. Since in the ordinary operation of the conventional catalytic reforming process, wherein influent hydrogen is autogenously produced, the prime source for any sulfur entering the reforming zone is the charge stock, the above limitation is ordinarily sufficient to insure that the reforming zone containing the catalyst is maintained in the substantially sulfur-free state. More specifically, since hydrogen is a by-product of the catalytic reforming process, ordinarily the input hydrogen stream required for the process is obtained by recycling a portion of the hydrogen rich stream recovered from the effluent withdrawn from the reforming zone. In this typical situation, this recycle hydrogen stream will ordinarily be substantially free of sulfur if the charge stock is maintained free of sulfur. If autogenous hydrogen is not utilized, then of course the concept of the present invention requires that the input hydrogen stream be maintained substantially sulfur-free; that is, less than 10 vol. ppm. of $H_2S$, and preferably less than 5 vol. ppm.

The only other possible sources of sulfur in this kind of process is sulfur that would be initially combined with the catalyst and/or with the plant hardware. As indicated hereinbefore, a highly preferred feature of the type of bimetallic catalyst used in the instant process is that it be substantially sulfur-free; therefore, sulfur released from the catalyst is not usually a problem in the present process. Hardware sulfur is ordinarily not present in a new plant; it only becomes a problem when the present process is to be implemented in a plant that has seen service with a sulfur-containing feed stream. In this latter case, the preferred practice of the present invention involves an initial pre-treatment of the sulfur-containing plant in order to remove substantially all of the decomposable hardware sulfur therefrom. This can be easily accomplished by any of the techniques for stripping sulfur from hardware known to those in the art; for example, the circulation of the substantially sulfur-free hydrogen stream through the internals of the plant at a relatively high temperature of about 800° to about 1200° F. until the $H_2S$ content of the effluent gas stream drops to a relatively low level typically, less than 5 vol. ppm. In sum, the sulfur-free feature of the present invention requires that the total amount of sulfur entering the reforming zone containing the hereinbefore described bimetallic catalyst must be continuously maintained at a substantially low level; specifically, the amount of sulfur must be held to a level equivalent to less than 10 wt. ppm., and preferably less than 1 wt. ppm. of the feed.

In the case where the sulfur content of the feed stream for the present process is greater than the amounts previously specified, it is, of course, necessary to treat the charge stock in order to remove the undesired sulfur contaminants therefrom. This is easily accomplished by using any one of the conventional catalytic pre-treatment methods such as hydrorefining, hydrotreating, hydrodesulfurization, and the like to remove substantially all sulfurous, nitrogenous and water-yielding contaminants from this feed stream. Ordinarily, this involves subjecting the sulfur-containing feed stream to contact with a suitable sulfur-resistant hydrorefining catalyst in the presence of hydrogen under conversion conditions selected to decompose sulfur contaminants contained therein and form hydrogen sulfide. The hydrorefining catalyst typically comprises one or moe of the oxides or sulfides of the transition metals of Groups VI and VIII of the Periodic Table. A particularly preferred hydrorefining catalyst comprises a combination of a metallic component from the iron group metals of Group VIII and of a metallic component of the Group VI transition metals combined with a suitable porous refractory support. Particularly good results have been obtained when the iron group component is cobalt and/or nickel and the Group VI transition metal is molybdenum or tungsten. The preferred support for this type of catalyst is a refractory inorganic oxides of the type previously mentioned. For example, good results are obtained with a hydrorefining catalyst comprising cobalt oxide and molybdenum oxide supported on a carrier material comprising alumina and silica. The conditions utilized in this hydrorefining step are ordinarily selected from the following ranges: a temperature of about 600° to about 950° F., a pressure of about 500 to about 5000 psig., a liquid hourly space velocity of about 1 to about 20 hr.$^{-1}$, and a hydrogen circulation rate of about 500 to about 10,000 standard cubic feet of hydrogen per barrel of charge. After this hydrorefining step, the hydrogen sulfide, ammonia and water liberated therein, are then easily removed from the resulting purified charge stock by conventional means such as a suitable stripping operation. Specific hydrorefining conditions are selected from the ranges given above as a function of the amounts and kinds of the sulfur contaminants in the feed stream in order to produce a substantially sulfur-free charge stock which is then charged to the reforming process of the present invention.

In one mode of operation of the present invention it is applied to a reforming process which has been operated with a bimetallic catalyst of the type previously characterized and with a sulfur-containing charge stock. If the input hydrogen stream is obtained autogenously, the concept of the present invention would only require that the charge stock be pre-treated by one of the techniques previously discussed, to remove substantially all sulfurous, nitrogenous and water-yielding contaminants therefrom. That is, in this case, only the charge stock need be pre-treated to bring its sulfur content down to the level previously specified in order to realize the benefits of the present invention. In this case, the residual sulfur in the reforming process will immediately start to fall because significant amounts of sulfur will be withdrawn from the system in the gaseous output stream, i.e., the excess recycle gas and the debutanizer overhead stream. After a while, the sulfur level in the process will decrease to the level where improved performance of the bimetallic catalyst will become evident. In the case where autogenous hydrogen is not utilized, then the concept of the present invention in this embodiment requires that both the input hydrogen stream and the charge stock be pre-treated to reduce the total amount of sulfur entering the reforming zone to the initial range given above. In either case, the improvement of the present invention is obtained by careful control over the total amount of sulfur continuously entering the reforming zone and it is this parameter that is the crucial parameter here.

It is generally preferred to utilize this bimetallic catalyst in a reaction environment in which the amount of water is held to carefully controlled levels. Essential to the achievement of this condition in the reforming zone is the control of the water level present in the charge stock and the hydrogen stream which are charged to the zone. Best results are ordinarily obtained when the total amount of water entering the zone from any source is held to a level in the range corresponding to about 5 to about 50 wt. ppm., expressed as weight of equivalent water in the charge stock. In general, when the amount of water entering this zone is greater than desired, a significant reduction can be accomplished by careful control of the water present in the charge stock and in the hydrogen stream; the charge stock and the hydrogen stream can be dried by using any suitable drying means known to the art such as a conventional solid adsorbent having a high selectivity for water; for instance, sodium or calcium zeolitic crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionation column or like device. And, in some cases, a combination of adsorbent drying and distillation drying may be used advantageously to effect almost complete removal of water from the charge stock. In the case where the total amount of water entering the reforming zone is below the desired range, the required amount of water is achieved by introducing into the reforming zone a suitable water additive such as water or an oxygen-containing substance that is reducible to water at reforming conditions. Typical oxygen-containing compounds that can be used are the alcohols, aldehydes, ketones and the like.

The reforming zone is operated under conditions selected to produce a high octane C$_5$+ reformate. The pressure utilized is preferably selected in the range of about 50 psig. to about 350 psig. In fact, it is a singular advantage of the present invention that it allows stable operation at lower pressures than have heretofore been successfully utilized in so-called "continuous" reforming systems (i.e., reforming for periods of about 15 to about 200 or more barrels of charge per pound of catalyst without regeneration). In other words, the present invention allows the operation of a continuous reforming system to be conducted at lower pressure (i.e., 50 to 350 psig.) for about the same or better catalyst life before regeneration as has been heretofore realized with conventional catalysts at higher pressures (i.e., 400 to 600 psig).

Similarly, the temperature required for reforming is generally lower than that required for a similar reforming operation using a high quality catalyst of the prior art. This significant and desirable feature of the present invention is a consequence of the selectivity of the bimetallic catalyst of the present invention for octane-upgrading reactions that are preferably induced in a typical reforming operation. Hence, the present invention requires a temperature in the range of from about 800° F. to about 1,100° F. and preferably about 900° F. to about 1,050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product is substantially lower for the process of the present invention than for a reforming process which is operated in exactly the same manner as the process of the present invention except for the exclusion of sulfur therefrom. Moreover, for the process of the present invention, the $C_5+$ yield loss for a given temperature increase is substantially lower than for a reforming process of this type operated with sulfur inclusion. In addition, hydrogen production is substantially higher with the present process.

The reforming process of the present invention also typically utilizes sufficient hydrogen to provide an amount of about 2 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used is selected from the range of about 0.1 to about 10 hr.$^{-1}$, with a value in the range of about 1 to about 5 hr.$^{-1}$ being preferred. In fact, it is a feature of the present invention that for the same severity level, it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

It is intended to cover by the following claims, all changes and modifications of the above disclosure of the present invention that would be self-evident to a man of ordinary skill in the catalytic reforming art.

I claim as my invention:

1. A process for catalytically reforming a substantially sulfur-free gasoline fraction, which process comprises contacting the gasoline fraction and a substantially sulfur-free hydrogen stream at reforming conditions with a substantially sulfur-free catalyst comprising a combination of a platinum group component, a tin component and a halogen component with a porous carrier material, wherein the components are present in amounts sufficient to result in the catalyst containing, on an elemental basis, about 0.01 to about 2 wt. % platinum group metal, 0.01 wt. % to about 5 wt. % tin and about 0.1 to about 3.5 wt. % halogen, wherein the tin component is uniformly dispersed throughout the porous carrier material in a particle size which is less than 100 Angstroms in maximum dimension, wherein substantially all of the platinum group component is present in the catalyst as an elemental metal and wherein substantially all of the tin component is present in the catalyst in an oxidation state above that of the elemental metal.

2. A process as defined in claim 1 wherein the platinum group component of the catalyst is platinum metal.

3. A process as defined in claim 1 wherein the platinum group metal is palladium metal.

4. A process as defined in claim 1 wherein the platinum group component of the catalyst is iridium metal.

5. A process as defined in claim 1 wherein the porous carrier material is a refractory inorganic oxide.

6. A process as defined in claim 5 wherein the refractory inorganic oxide is alumina.

7. A process as defined in claim 1 wherein the halogen component is chlorine or a compound of chlorine.

8. A process as defined in claim 1 wherein the halogen component is fluorine or a compound of fluorine.

9. A process as defined in claim 1 wherein the tin component of the catalyst is tin oxide.

10. A process as defined in claim 1 wherein the atomic ratio of tin to platinum group metal contained in the composite is selected from the range of 0.1:1 to about 3:1.

11. A process as defined in claim 1 wherein the catalyst contains, on an elemental basis, about 0.05 to about 1 wt. % platinum group metal, about 0.1 to about 1 wt. % tin and about 0.5 to about 1.5 wt. % halogen.

12. A process as defined in claim 1 wherein the hydrogen stream is autogenously produced and the gasoline fraction contains less than about 10 wt. ppm. of sulfur.

13. A process as defined in claim 1 wherein the total amount of sulfur entering the reforming zone is continuously maintained at a value corresponding to less than about 10 wt. ppm. of the gasoline fraction.

14. A process as defined in claim 1 wherein the total amount of water entering the reforming zone corresponds to about 5 to about 50 wt. ppm. of the gasoline fraction.

15. In a process for catalytically reforming a sulfur-containing gasoline charge stock; wherein the charge stock and autogenous hydrogen are contacted at reforming conditions with a catalyst comprising a combination of the platinum group component, a tin component and a halogen component with a porous carrier material; wherein the components are present in the catalyst in amounts sufficient to result from the composite containing on an elemental basis, about 0.01 to about 2 wt. % platinum group metal, about 0.01 to about 5 wt. % tin and about 0.1 to about 3.5 wt. % halogen; wherein the tin component is uniformly dispersed throughout the porous carrier material in a particle size which is less than 100 Angstroms in maximum dimension; wherein substantially all of the platinum group component is present in the catalyst as an elemental metal; and, wherein substantially all of the tin component is present in the catalyst in an oxidation state above that of the elemental metal, the improvement which comprises operating said process in a substantially sulfur free environment, said catalyst being substantially sulfur-free, and said gasoline charge stock being pretreated to remove substantially all sulfurous, nitrogenous and water-yielding contaminants therefrom.

* * * * *